United States Patent [19]

Hiroshima et al.

[11] Patent Number: 4,495,086

[45] Date of Patent: Jan. 22, 1985

[54] METHOD AND APPARATUS FOR PREPARING EMULSIONS

[75] Inventors: Koichi Hiroshima, Kawasaki; Yoshinori Tada, Chigasaki, both of Japan

[73] Assignee: Ransburg Japan, Limited, Tokyo, Japan

[21] Appl. No.: 398,441

[22] Filed: Jul. 14, 1982

[30] Foreign Application Priority Data

Aug. 19, 1981 [JP] Japan ............................... 56-129606
Jan. 13, 1982 [JP] Japan ................................... 57-3894

[51] Int. Cl.$^3$ .................. B01F 13/08; B01J 13/00; B05B 5/04
[52] U.S. Cl. .................................... 252/314; 252/312; 252/359 A; 252/359 B; 366/165; 366/167
[58] Field of Search ............... 252/314, 359 A, 359 B; 366/165, 167; 118/626; 427/30

[56] References Cited

U.S. PATENT DOCUMENTS

| | | | |
|---|---|---|---|
| 1,295,283 | 2/1919 | Diebold | 252/314 |
| 1,406,791 | 2/1922 | Werner | 252/314 |
| 1,668,136 | 5/1928 | Agthe | 252/314 |
| 2,976,175 | 3/1961 | Reindl | 427/30 |
| 3,011,472 | 12/1961 | Kent et al. | 427/30 X |
| 3,794,299 | 2/1974 | Wagner et al. | 366/165 X |
| 3,856,269 | 12/1974 | Fothergill et al. | 366/165 |
| 4,237,028 | 12/1980 | Hughes et al. | 252/359 B |

FOREIGN PATENT DOCUMENTS

764918 1/1957 United Kingdom ............... 252/314
862488 3/1961 United Kingdom ............... 366/165

*Primary Examiner*—Richard D. Lovering
*Attorney, Agent, or Firm*—Oblon, Fisher, Spivak, McClelland & Maier

[57] ABSTRACT

Method and apparatus for continuously producing emulsions with particles of a disperse phase liquid in a continuous phase liquid, employing an emulsifying vessel which is interiorly provided with a gravitative flow surface and a feeder for supplying the continuous phase liquid to the flow surface for forming thereon a stream of the continuous phase liquid. On the other hand, disposed within the emulsifying vessel is a rotary atomizing head which is connected to a disperse phase liquid source and a rotational drive means and maintained at a high voltage to stratify and form a spray of atomized particles of the disperse phase liquid flying toward the flow surface under the influence of centrifugal force and electrostatic action. The disperse phase particles from the rotary atomizing head are entrained and dispersed in the stream of the continuous phase liquid on the flow surface of the emulsifying vessel to form an emulsion. The resulting emulsion is collected in a receptacle. In some cases, the emulsifier is provided with a hot steam feed pipe for feeding hot steam to the rotary atomizing head to prevent solidification of atomized disperse phase particles on the atomizing head.

20 Claims, 9 Drawing Figures

METHOD AND APPARATUS FOR PREPARING EMULSIONS

BACKGROUND OF THE INVENTION (1) Field of the Invention

This invention relates to a method and an apparatus for continuously producing an emulsion containing a dispersed liquid phase in a continuous liquid phase. More particularly, the invention concerns a method and an apparatus for producing an emulsion continuously by mixing atomized particles of a dispersed phase liquid, which are sprayed from a rotary atomizing head, with a continuous phase liquid flowing down in the form of a thin filmy stream within an emulsifying vessel.

(2) Description of the Prior Art

There have heretofore been employed various methods for preparing emulsions by mechanically shaking a mixture of continuous and disperse phase liquids, which however have a serious problem that it is difficult to control the particle size of the dispersed phase liquid, often resulting in an unduly large particle size distribution.

On the other hand, there have been proposed methods for preparing an emulsion in a continuous and stable manner without the above-mentioned problem, including U.S. Pat. No. 4,237,028 which discloses a method for preparing an emulsion by atomizing a disperse phase liquid electrostatically by flowing the liquid over the edge of a flat blade which is applied with a high voltage, forming a spray of atomized particles of the disperse phase liquid against streams of a continuous phase liquid flowing down along channels formed on a carrier.

However, the method of the above-mentioned U.S. patent has a number of drawbacks as well. More specifically, the use of a flat blade imposes certain limits on the properties of the disperse phase liquid to be atomized depending upon such as the width and angle of inclination of the blade, in some cases making the electrostatic atomization utterly difficult with particular kinds of disperse phase liquid, in addition to the difficulty of atomizing a large quantity of the disperse phase liquid. There is a further problem that it is difficult not only to attain uniform atomization of the disperse phase particles but also to control the particle size, due to varying the voltage to be applied to the blade being the sole factor for controlling the particle atomization. Besides, the channels which are provided on the carrier for the continuous phase liquid become an obstacle to the formation of a uniform thin filmy stream of the continuous phase liquid as required in the production of an emulsion of satisfactory quality. There is a still further problem that the disperse phase liquid which flows down over the blade is easily influenced by variations in viscosity and ambient temperature, in addition to the foregoing drawback of difficulty to control its particle size, resulting in a wide particle size distribution which is detrimental to the production of high quality emulsions.

SUMMARY OF THE INVENTION

It is therefore an object of the present invention to eliminate the above-mentioned problems or difficulties of the prior art. A more particular object of the present invention is to provide a method and apparatus for continuously producing an emulsion of high quality.

It is another object of the present invention to provide a method and an apparatus for continuously producing a uniform emulsion with fine particle size and narrow particle size distribution.

According to one aspect of the present invention, there is provided an emulsifier which comprises: an emulsifying vessel interiorly providing a gravitative flow surface for forming thereon a stream of a continuous liquid; a feed means for supplying the continuous phase liquid to the flow surface of the emulsifying vessel; a rotary atomizing head located within the emulsifying vessel in communication with a supply of a disperse phase liquid and driveable by a rotational drive means for rotation within the emulsifying vessel; a high-voltage power supply connected to the rotary atomizing head to apply thereto a high voltage to atomize the disperse phase liquid in cooperation with the rotational drive means and directing electrostatically charged particles of the disperse phase liquid toward the flow surface of the emulsifying vessel, thereby continuously dispersing the particles of the disperse phase liquid in the stream of the continuous phase liquid; and a receptacle located beneath the flow surface of the emulsifying vessel for collecting the resulting emulsion.

According to another aspect of the present invention, there is provided a method for continuously producing an emulsion, which comprises: feeding a continuous phase liquid into an emulsifying vessel to form a thin filmy stream of the continuous phase liquid on a flow surface on the inner periphery of the vessel; feeding a disperse phase liquid to a rotary atomizing head being rotated within the emulsifying vessel and applied with a predetermined voltage; atomizing the disperse phase liquid by the rotary atomizing head to form a spray of disperse phase particles of a desired size; spraying the disperse phase particles toward the filmy stream of the continuous phase liquid on the inner periphery of the emulsifying vessel; and dispersing the disperse phase liquid in the continuous phase liquid.

For the disperse phase liquid, there may be used a material which is in solidified state or which shows a high viscosity at room temperature. In such a case, the disperse phase liquid to be supplied to the rotary atomizing head is maintained in hot or heated state. Simultaneously, hot steam is supplied to the rotary atomizing head to ensure optimum atomization of the disperse liquid by preventing its solidification on a film-forming surface on inner periphery of the rotary atomizing head. In this instance, it is to be understood that the term "hot steam" includes superheated steam.

The above and other objects, features and advantages of the present invention will become apparent from the following description and the appended claims, taken in conjunction with the accompanying drawings which show by way of example some preferred embodiments of the present invention and which of course should not be construed as limiting the scope of the present invention.

PARTICULAR DESCRIPTION OF THE INVENTION AND PREFERRED EMBODIMENTS

Referring first to FIGS. 1 to 5, there is shown a first embodiment of the present invention, which includes an emulsifying vessel 1 of a metallic material. The emulsifying vessel 1 is conical or in a truncated cone or cup-like shape in section and its whole body is maintained at the earth potential by grounding. The emulsifying vessel 1 has on its inner periphery a gravitative flow surface 2 which is constituted by a smoothly finished tapered or arcuately curved surface with a taper angle or curvature suitable for forming a thin filmy stream of a continuous phase liquid and an emulsion produced. The emulsifying vessel 1 is provided with an on-off valve 3 in its bottom portion, the on-off valve 3 having on its discharge side a receptacle 4 to collect the emulsion which is produced by the operation as will be described hereinlater. Indicated at 5 is a support base for the emulsifying vessel 1.

A continuous phase liquid feeder 6 (hereinafter referred to as "feed pipe") which is constituted by an annular tube in the particular embodiment shown is located in an upper portion of the emulsifying vessel 1 in small gap relation with the inner wall surface of the vessel 1. The feed pipe 6 interiorly defines an annular passage 7 with a multitude of small spout holes 8 opening toward the flow surface 2 of the emulsifying vessel 1 to feed the continuous phase liquid onto the flow surface 2 (see FIG. 2). As shown particularly in FIG. 3, the feed pipe 6 may be provided with slits 8', instead of the afore-mentioned small holes 8, thereby to spout the continuous phase liquid onto the flow surface. Alternatively, the spout holes 8 may be replaced by nozzle units 8" each one of which is provided with a baffle plate 8"B in front of a nozzle hole 8"A, feeding the continuous phase liquid onto the flow surface through a downwardly opened mouth 8"C after collision against the baffle plate 8"B.

Figure 1:
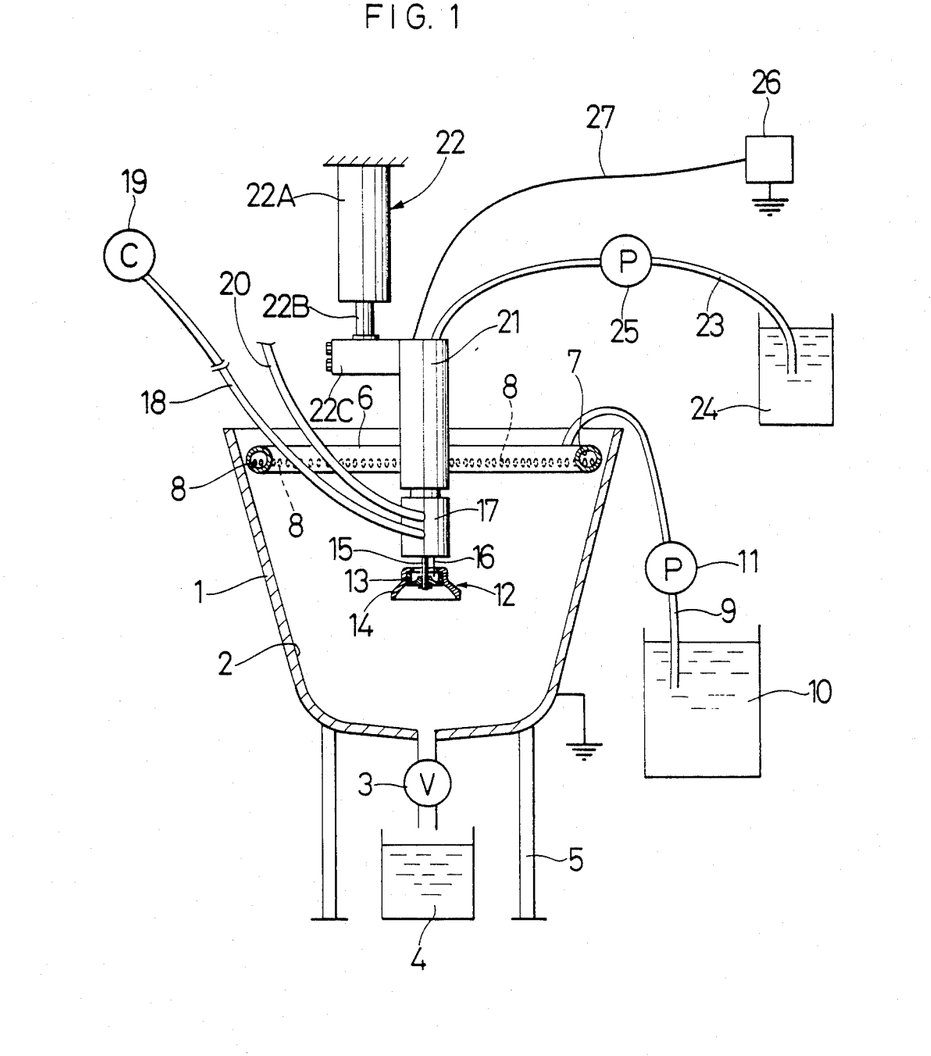
FIG. 1 is a schematic view of an emulsifying apparatus embodying the present invention.
Figure 2:
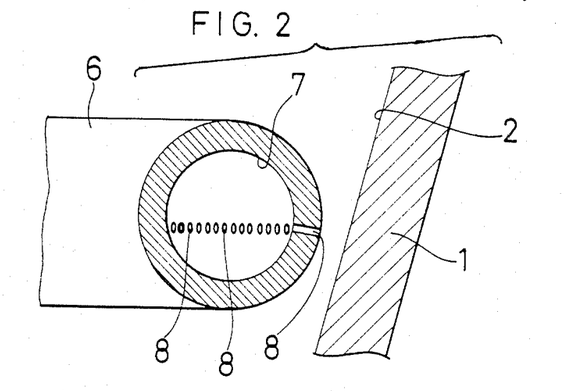
FIG. 2 is an enlarged fragmentary view of a continuous phase liquid feeder shown in FIG. 1.
Figure 3:
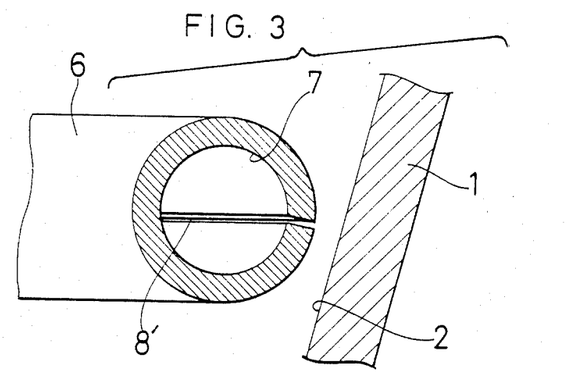
FIG. 3 is a view similar to FIG. 2 but showing a modified construction of the continuous phase liquid feeder.
Figure 4:
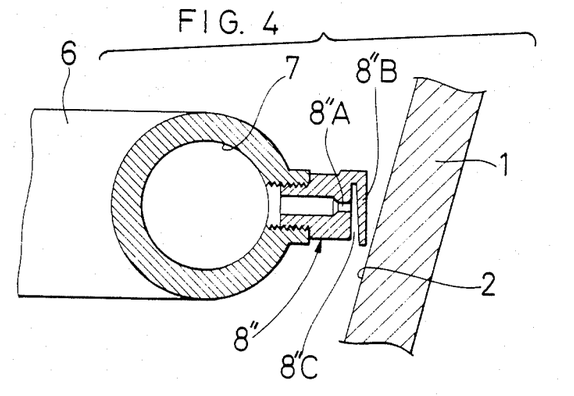
FIG. 4 is a view similar to FIG. 2 but showing still another modification of the continuous phase liquid feeder.

Indicated at 9 is a continuous phase liquid supply pipe one end of which is inserted into a reservoir 10 of the continuous phase liquid, with the other end opened into the annular passage 7 of the feed pipe 6. The supply pipe 9 contains in its length a pump 11, for example, a gear type pump with a steplessly variable delivery rate.

Figure 5:
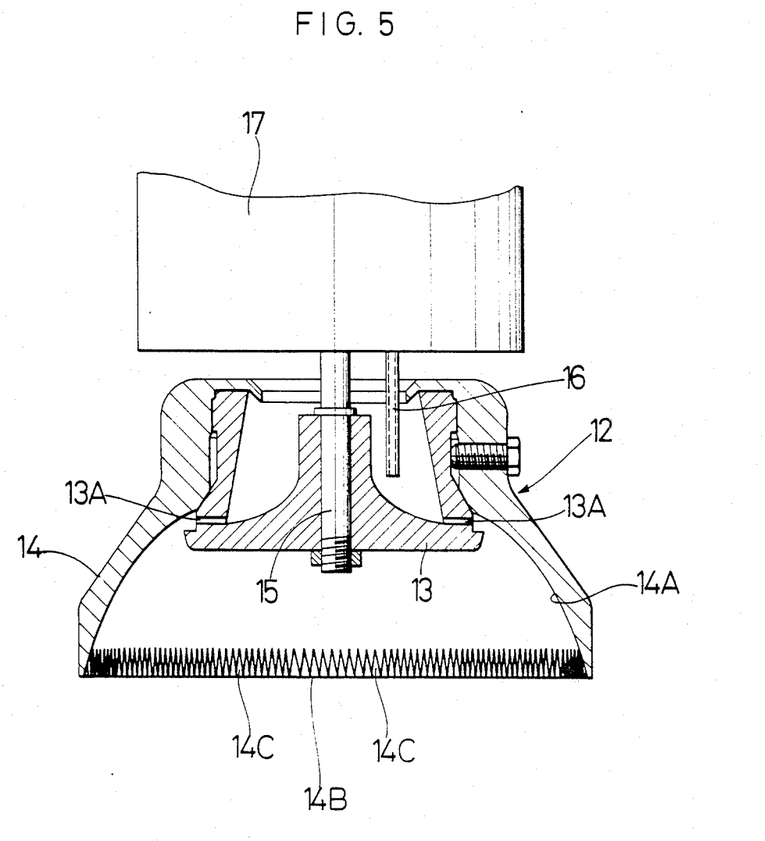
FIG. 5 is an enlarged fragmentary view of a rotary atomizing head shown in FIG. 1.

Referring now to FIG. 5, there is shown on an enlarged scale a rotary atomizing head 12 which is constituted, for example, by a hub member 13 and an atomizing head body proper 14 which is securely fixed to the hub member 13 which is securely mounted on a rotational shaft 15. A disperse phase liquid feed pipe 16 is projected and opened into the hub member 13 in communication with radial outlet passages 13A for the disperse phase liquid. The atomizing head body 14 is further provided with a wall 14A for forming the disperse phase liquid into a thin filmy stream and a hem portion 14B with a multitude of narrow grooves 14C which are provided onto the lower edge of the film-forming wall 14A at uniform intervals for uniformalizing and accelerating atomization of the liquid system.

The reference numeral 17 designates an air motor which serves as a rotational drive source for the rotary shaft 15, and, in the particular embodiment shown, it is constituted by a turbo motor or a vane motor which is rotated by an air supply received from a compressed air source 19 through an air feed pipe 18. Indicated at 20 is an air discharge pipe. In this instance, the rotational speed of the air motor 17 is variable by controlling the air supply from the compressed air source 19 by means of a regulator valve (not shown). The rotational drive source is not limited to the air motor 17 and may alternatively employ an electric motor of variable or non-variable speed especially in a case where the rotary atomizing head 12 has a large diameter.

Denoted at 21 is an insulating member for electrically insulating the air motor 17 from a lift mechanism 22 which will be described hereinlater. The insulating member 21 is formed of nylon or other suitable insulating material and securely supports thereon the air motor 17. The disperse phase liquid atomizer assembly which is constituted by the rotary atomizing head 12, air motor 17 and insulating member 21 is movable up and down by means of a lift mechanism 22 formed, for example, by a pneumatic or hydraulic cylinder or a rack-pinion mechanism. In a case where the lift mechanism 22 is constituted by a pneumatic cylinder with a cylinder 22A and a piston rod 22B connected to a piston (not shown) which is slidable in the cylinder 22A, the piston rod 22B is connected to the insulating member 21 through a mounting bracket 22C.

On the other hand, a disperse phase liquid supply pipe 23 which is connected at one end to the disperse phase liquid reservoir 24 is connected at the other end to the afore-mentioned disperse phase liquid feed pipe 16 through the insulating member 21. Provided within the length of the pipe 23 is a variable discharge type pump 25 which may be a gear pump similarly to the pump 11 for the continuous phase liquid.

The emulsifier of the invention further includes a high-voltage power supply 26 which is constituted by a rectifier circuit and a variable voltage transformer, and capable of increasing the voltage from a single phase AC power source (100 or 200V) normally to a high DC voltage in the range of ±150 kv. The high voltage from the power supply 26 is applied to the rotary atomizing head 12 at the distal end of the insulating member 21 through a high voltage cable 27.

With the first embodiment of the invention as described above, an emulsion is prepared in the following manner.

In the first place, air is fed to the air motor 17 from the compressed air source 19 through the air pipe 18 to rotate the motor, for example, at a speed of 80,000 rpm at maximum, rotating the rotary atomizing head 12 through the rotational shaft 15. Simultaneously, a voltage lower than ±150 kv is applied to the rotary atomizing head 12 by the high voltage power supply 26 through the cable 27, with the rotary atomizing head 12 located in the position shown.

Upon starting the pump 11 at a predetermined delivery rate, the continuous phase liquid in the reservoir 10 is taken up by the pump 11 through the pipe 9 and fed to the annular passage 7 of the feed pipe 6. The continuous phase liquid is thus fed to the flow surface 2 of the emulsifying vessel 1 through a plural number of small holes 8, slits 8' or nozzles 8", the liquid forming a filmy stream of uniform thickness as it flows down by gravity along the smoothly finished tapered or curved surface 2. Therefore, the flow surface 2 bears thereon an uninterrupted stream of the continuous phase liquid.

In the next place, the pump 25 is started at a predetermined discharge rate, whereupon the disperse phase liquid in the reservoir 24 is sent forward by the pump 25 through the feed pipe 16 and into the hub member 13 of the rotary atomizing head 12. The disperse phase liquid supplied to the hub member 13 is spouted onto the film-forming surface 14A on the inner periphery of the atomizing head body 14 through a number of outlet passages 13A in the hub member 13. Since the rotary atomizing head 12 is put in high speed rotation, the spouted disperse phase liquid is spread under the influence of centrifugal force, forming a thin filmy stream uniformly over the entire areas of the film-forming surface as it flows down toward the grooved hem portion 14B. Upon reaching the grooves 14C of the hem portion 14B, which are formed equidistantly, for example, at a pitch of 0.35 mm and with a depth of 0.2 mm, the stream of the disperse phase liquid is divided into narrow threads (cusps) by respective grooves 14C. In addition to the influence of the centrifugal force by rotation of the rotary atomizing head 12, the cusps are atomized by an electrostatic field which is formed between the rotary atomizing head 12 and the emulsifying vessel 1, forming a spray of substantially spherical fine particles of the disperse phase liquid.

The disperse phase particles which have been atomized in this manner are propagated along lines of electric force toward the filmy stream of the continuous phase liquid on the flow surface 2 of the emulsifying vessel 1, and mixed with and completely dispersed into the latter to produce an emulsion of fine and uniform particle size. The resulting emulsion is gathered at the bottom of the emulsifying vessel 1 and collected in the emulsion receptacle 4 through the on-off valve 3.

In the foregoing operation, even if the rotary atomizing head 12 is fixed at a certain level, it is possible to vary the potential gradient between the grounded emulsifying vessel 1 and the rotary atomizing head 12 by varying the output voltage of the high voltage power supply 26 or by varying the rotational speed of the air motor 17 for the purpose of controlling the atomization of the disperse phase liquid appropriately depending upon the viscosity, kind or other properties thereof.

On the other hand, if the rotary atomizing head 12 lifted up or down by the lift mechanism 22 to vary the distance between the rotary atomizing head 12 and the flow surface 2, the potential gradient between the rotary atomizing head 12 and emulsifying vessel 1 can be weakened or strengthened arbitrarily for controlling the disperse phase liquid atomization.

Further, it is possible to vary the mixing ratio of the emulsion by changing the relative discharge rate of the pumps 11 and 25 of the continuous and disperse phase liquids.

Figure 6:
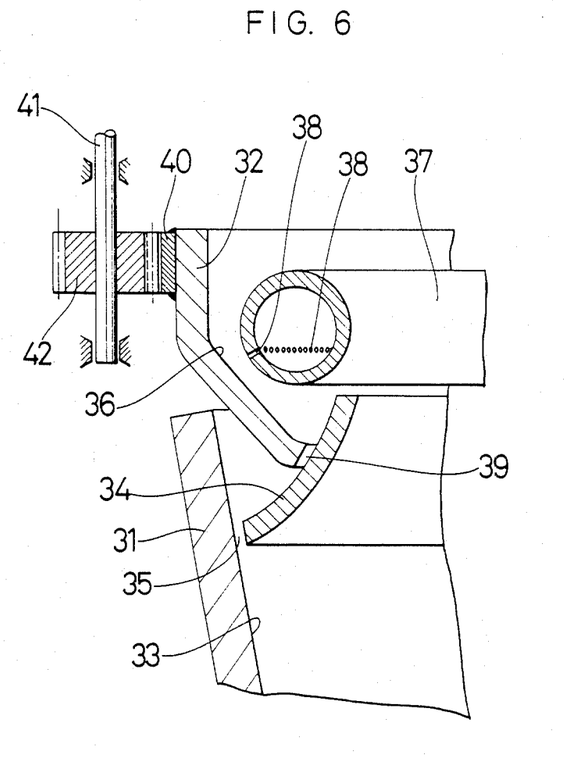
FIG. 6 is an enlarged fragmentary view showing details of the emulsifying apparatus according to in another embodiment of the present invention.

Referring now to FIG. 6, there is shown another embodiment of the present invention, employing an emulsifying vessel constituted by a lower vessel 31 and an upper vessel 32 which is rotatable relative to the lower vessel 31. More particularly, an annular guide plate 34 is located in the proximity of a flow surface 33 of the lower emulsifying vessel 31 to form therebetween a gap space 35 through which the continuous phase liquid flows out. The upper emulsifying vessel 32 has its lower portions bent inwardly toward the guide plate 34 to receive on its flow surface 36 the continuous phase liquid which is spouted out through small holes 38 of the feed pipe 37. The inwardly bent lower end of the upper vessel 32 is terminated short of the guide plate 34, leaving a clearance 39 for cascading the continuous phase liquid therethrough. Further, the upper vessel 32 is provided with a gear wheel 40 around its outer periphery, in meshed engagement with a pinion gear 42 which is securely mounted on a rotational shaft 41.

In the second embodiment of the invention with above-described arrangement, the upper emulsifying vessel 32 which has its gear wheel 40 meshed with the pinion gear 42 of the rotational shaft 41 is rotated upon driving the latter from a rotational drive source (not shown). Therefore, the continuous phase liquid which is spouted onto the flow surface 36 through the small holes 38 of the feed pipe 37 is formed into a thin filmy stream by the rotation of the upper vessel 32 before falling onto the guide plate 34 through the clearance 39, then flowing down the guide plate 34 and then the flow surface 33 of the lower vessel 31 via clearance 35.

In this embodiment, employing an emulsifying vessel with an upper vessel 32 which is rotatable in the above-described manner, it can form the continuous phase liquid into a uniform filmy stream more acceleratedly as compared with the first embodiment.

Figure 7:
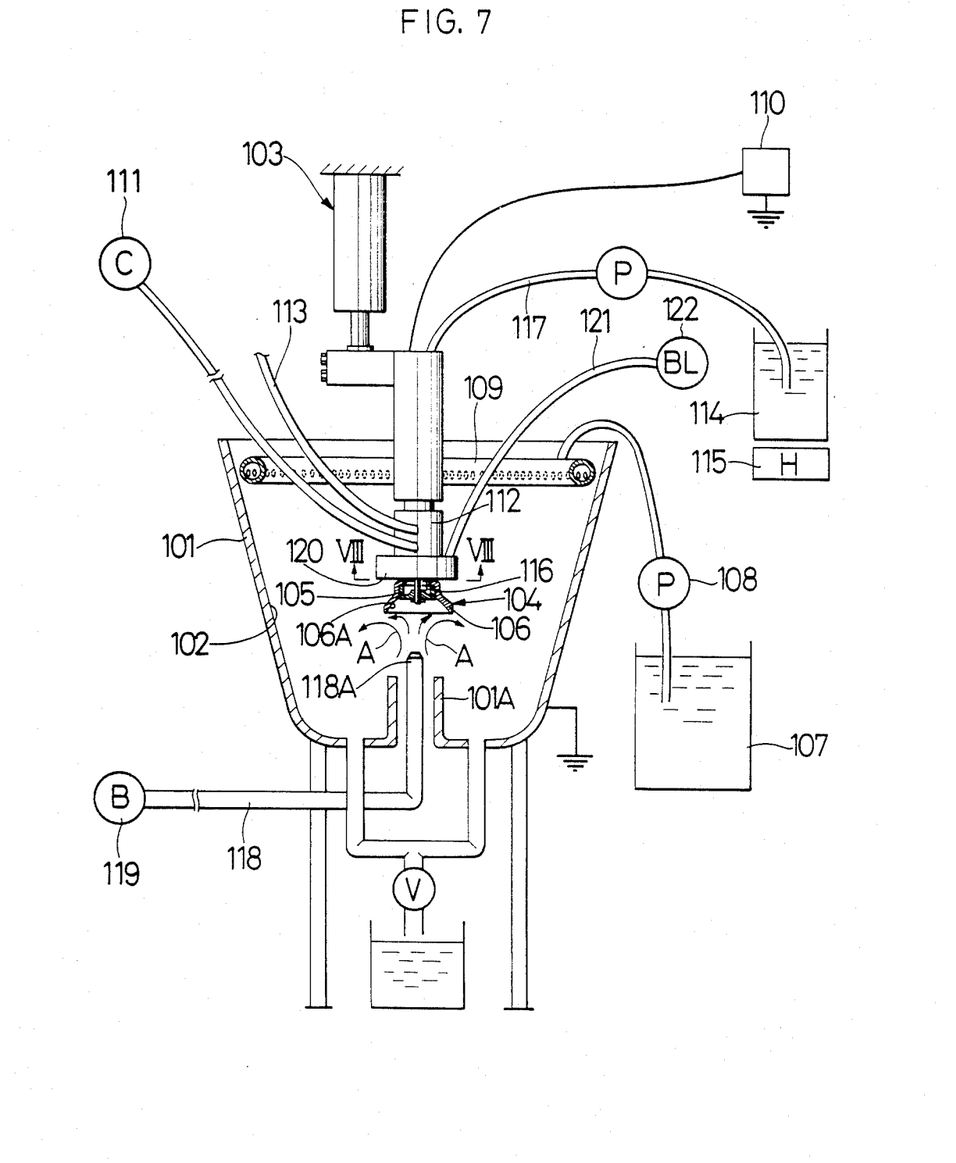
FIG. 7 is a view similar to FIG. 1 but showing still another embodiment of the present invention.
Figure 8:
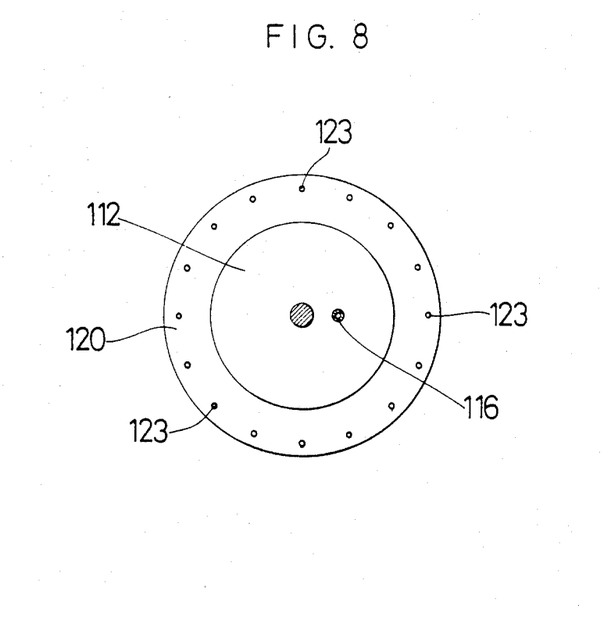
FIG. 8 is a sectional view taken on line VII—VII of FIG. 7.

FIGS. 7 and 8 illustrate a further embodiment of the present invention, which is suitable for producing emulsions of oil and fat which are in solidified state or highly viscous at room temperature, for example, fatty acid of beef tallow, hardened oil, castor wax and the like.

The emulsifier of the third embodiment is likewise provided with a flow surface 102 on the inner periphery of an emulsifying vessel 101. Inserted into the emulsifying vessel 101 is a rotary atomizing head 104 which is vertically movably supported on a lift mechanism 103. The rotary atomizing head 104 consists of a hub member 105 and a bell-shaped spray head body 106. The continuous phase liquid which is supplied from a reservoir 107 to a continuous phase liquid feeder 109 by a pump 108 is spouted onto a flow surface 102 on the inner periphery of the emulsifying vessel 101 in the same manner as in the first embodiment. Also similarly to the first embodiment, a high voltage is applied to the rotary atomizing head 104 by a high voltage power supply 110, while rotating an air motor 112 by air supply from a compressed air source 111, which is discharged through air pipe 113.

In this embodiment which is intended for preparing emulsions of normally solidified disperse phase liquids, the disperse liquid reservoir 114 is provided with an electric heater or other heating means 115 for keeping the fat and oil of the disperse phase in liquefied state. A disperse phase liquid feed pipe 116 which is projected into the hub member 105 of the rotary atomizing head 104 is connected to one end of a heating or heat retaining pipe 117 which is connected to the disperse phase liquid reservoir 114 at the other end thereof.

Upon rotating the rotary atomizing head at a high speed, an air pumping phenomenon is induced by vacuum which is produced in the vicinity of the film-forming surface 106A on the inner periphery of the spray head body 106. As a result, the film-forming surface 106A is cooled by the convection of sucked air which occurs as indicated by arrow A in FIG. 7. Therefore, the disperse phase liquid spouted onto the film-forming surface 106A from the feed pipe 116 is cooled off with increases in viscosity and solidified on the film-forming surface 106A, failing to undergo atomization.

In order to avoid this, the embodiment of FIG. 7 is provided with a hot steam feed pipe 118 which has its one end portion bent upward and opened toward the spray head body 106 of the rotary atomizing head 104 as indicated at 118A through an annular riser wall 101A at the bottom of the emulsifying vessel 101. The other end of the steam feed pipe 118 is connected to a boiler 119 to receive therefrom hot steam, for example, of about 150° C. and 5 kg/cm². The hot steam is injected against the film-forming surface 106A of the spray head body 106 from the end opening 118A of the steam feed pipe 118, preventing the disperse phase liquid from being cooled off by the rotation of the rotary atomizing head 104.

Further, the air motor 112 is provided with an annular housing 120 of a heat-resistant synthetic resin material, which is connected to one end of an air pipe 121 which is led from a hot air blower 122 for feeding hot air into the housing 120. As illustrated particularly in FIG. 8, the housing 120 is provided with a plural number of air outlets 123 each opening toward the rotary atomizing head 104. The rotary atomizing head 104 is therefore heated by the blasts of hot air to prevent the disperse phase liquid from cooling.

In the emulsifying operation by the above-described apparatus, the rotary atomizing head 104 which is put in high speed rotation by the air motor 112 is applied with a high voltage by the high voltage power supply 110 in the same manner as in the foregoing embodiments and at the same time supplied with the heated disperse phase liquid. Simultaneously, the hot steam which is released from the outlet end 118A of the steam feed pipe 118 is directed toward the film-forming surface 106A of the rotary atomizing head 104 by the convection of sucked air A resulting from the above-mentioned air pumping phenomenon, while the hot air from the air outlet 123 is blasted against the rotary atomizing head 104. Therefore, the disperse phase liquid is kept from cooling on the film-forming surface 106, permitting to produce continuously an emulsion of good dispersive property. Since the hot steam mixes into the continuous phase liquid, it has no possibility of causing a trouble to the emulsifying operation.

Figure 9:
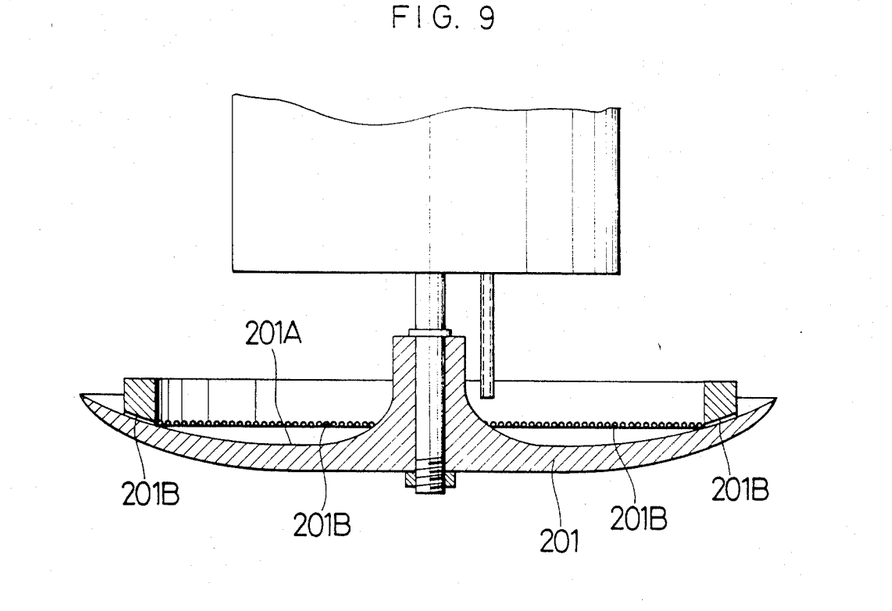
FIG. 9 is a view similar to FIG. 5 but showing a modification of a rotary atomizing head.

Although the emulsifying vessel has been described as having a conical or truncated cone shape or a cup-like shape in the foregoing embodiments, it may be formed in a conical shape which is akin to a cylinder. Further, the grooves provided in the hem portion of the rotary atomizing head ensure good atomization of continuous phase liquid of high viscosity, but there may be employed a rotary atomizing head without such grooves if circumstances permit. Moreover, a mere support structure may be used for the rotary atomizing head in substitution of the lift mechanism if desired. On the other hand, the bell type rotary atomizing head body may of course be replaced by a dish or disk type rotary atomizing head 201 as shown in FIG. 9. The rotary atomizing head 201 is provided on the upper surface with a wall 201A for forming the disperse phase liquid into a thin filmy stream. Further, the disperse phase liquid passages 201B are formed in the vicinity of the outer periphery on the wall 201A.

We claim:

1. An apparatus for producing emulsions by spraying particles of a disperse phase liquid into a continuous phase liquid, said apparatus comprising in combination:
   (a) an emulsifying vessel interiorly providing a gravitiative flow surface for forming thereon a stream of said continuous phase liquid;
(b) a continuous phase liquid feeder for directing said continuous phase liquid to said gravitative flow surface of said emulsifying vessel;
(c) a rotary atomizing head disposed in said emulsifying vessel in communication with a disperse phase liquid supply;
(d) a rotational drive means for rotatably driving said rotary atomizing head within said emulsifying vessel;
(e) a high voltage power supply connected to said rotary atomizing head to apply thereto a high voltage to atomize said disperse phase liquid in cooperation with said rotational drive means and to direct electrostatically charged particles of said disperse phase liquid toward said gravitative flow surface of said emulsifying vessel along lines of electric force formed between said rotary atomizing head and said emulsifying vessel, thereby continuously dispersing the atomized particles of said disperse phase liquid in said stream of said continuous phase liquid; and
(f) a receptacle located beneath said gravitative flow surface of said emulsifying vessel for collecting the resulting dispersion.

2. An emulsifying apparatus as defined in claim 1, further comprising a hot steam feed pipe led into said emulsifying vessel and opened toward said rotary atomizing head.

3. An emulsifying apparatus as defined in claim 2, wherein said rotational drive means includes a heated air feeder adapted to direct heated air towards said rotary atomizing head.

4. An emulsifying apparatus as defined in claim 1, wherein said rotational drive means includes a heated air feeder adapted to direct heated air toward said rotary atomizing head.

5. An emulsifying apparatus as defined in claim 1, wherein said emulsifying vessel is provided with a conical gravitative flow surface.

6. An emulsifying apparatus as defined in claim 1, wherein said emulsifying vessel is provided with a gravitative flow surface of a truncated cone shape.

7. An emulsifying apparatus as defined in claim 1, wherein said emulsifying vessel is provided with a gravitative flow surface of a cup-like shape.

8. An emulsifying apparatus as defined in claims 5, 6 or 7, wherein said rotary atomizing head is supported on a lift mechanism vertically movably along with said rotational drive means.

9. An emulsifying apparatus as defined in claim 1, wherein said rotary atomizing head is provided with a bell-shaped surface for forming a filmy stream of said disperse phase liquid.

10. An emulsifying apparatus as defined in claim 1, wherein said rotary atomizing head is provided with a disc-like surface for forming a filmy stream of said disperse phase liquid.

11. An emulsifying apparatus as defined in claims 9 or 10, wherein said film-forming surface for said disperse phase liquid is provided with a multitude of grooves at a predetermined pitch along the lower marginal edge thereof.

12. An emulsifying apparatus as defined in claim 1, wherein said continuous phase liquid feeder is constituted by an annular tube.

13. An emulsifying apparatus as defined in claim 12, wherein said annular tube is provided with a multitude of small spout holes opening toward said gravitative flow surface of said emulsifying vessel.

14. An emulsifying apparatus as defined in claim 12, wherein said annular tube is provided with slits opening toward said gravitative flow surface of said emulsifying vessel.

15. An emulsifying apparatus as defined in claim 12, wherein said annular tube is provided with a plural number of nozzle units each having a nozzle hole for spouting said continuous phase liquid and a baffle plate located in front of said nozzle hole.

16. An emulsifying apparatus as defined in claim 1, wherein the output voltage of said high voltage power supply is variable.

17. An emulsifying apparatus as defined in claim 1, wherein said rotational drive means is a variable speed motor.

18. An emulsifying apparatus as defined in claim 1, wherein said emulsifying vessel is split into a lower emulsifying vessel and an upper emulsifying vessel rotatable relative to said lower emulsifying vessel.

19. A method for producing an emulsion by spraying particles of a disperse phase liquid into a continuous phase liquid, said method comprising the steps of:
(a) feeding said continuous phase liquid to a gravitative flow surface on the inner periphery of an emulsifying vessel and allowing said continuous phase liquid to flow therealong due to the force of gravity in the form of a thin filmy stream;
(b) feeding said disperse phase liquid to a rotary atomizing head;
(c) rotating said rotary atomizing head in said emulsifying vessel while applying a predetermined high voltage to said rotary atomizing head to thereby atomize said disperse phase liquid to form a spray of disperse phase particles of a desired size; and
(d) directing said spray of disperse phase particles to impact on said filmy stream of said continuous phase liquid on the gravitative flow surface on the inner periphery of said emulsifying vessel to thereby disperse said disperse phase particles in said continuous phase liquid.

20. A method for producing an emulsion by spraying particles of a disperse phase liquid into a continuous phase liquid, said method comprising the steps of:
(a) feeding said continuous phase liquid to a gravitative flow surface on the inner periphery of an emulsifying vessel and allowing said continuous phase liquid to flow therealong due to the force of gravity int he form of a thin filmy stream;
(b) feeding said disperse phase liquid to a rotary atomizing head;
(c) rotating said rotary atomizing head in said emulsifying vessel while applying a predetermined high voltage and feeding hot steam in said rotary atomizing head to thereby atomize said disperse phase liquid to form a spray of atomized disperse phase particles; and
(d) directing said spray of disperse phase particles to impact on said filmy stream of said continuous phase liquid on the gravitative flow surface on the inner periphery of said emulsifying vessel to thereby disperse said dispersed phase particles in said continuous phase liquid.

* * * * *